United States Patent [19]
Chauvigne

[11] 3,964,685
[45] June 22, 1976

[54] LAWN SPRINKLING AND SIMILAR INSTALLATIONS

[75] Inventor: Michel Chauvigne, Cluses, France

[73] Assignee: Carpano & Pons S.A., France

[22] Filed: Apr. 3, 1975

[21] Appl. No.: 564,593

[30] Foreign Application Priority Data
Apr. 9, 1974  France .............................. 74.12478

[52] U.S. Cl. .................................. 239/66; 239/68; 239/70
[51] Int. Cl.² ......................................... B05B 12/04
[58] Field of Search .............................. 239/66–70; 137/119, 625.13, 630.16, 630.22

[56] References Cited
UNITED STATES PATENTS

| | | | |
|---|---|---|---|
| 1,272,404 | 7/1918 | Elder | 239/69 X |
| 1,745,536 | 2/1930 | Gresham | 239/67 X |
| 2,267,492 | 12/1941 | Burroughs | 239/66 |
| 3,667,498 | 6/1972 | Mizuno | 239/66 |

Primary Examiner—John J. Love
Attorney, Agent, or Firm—Robert E. Burns; Emmanuel J. Lobato; Bruce L. Adams

[57] ABSTRACT

A lawn sprinkling installation has a series of dosing valves arranged in cascade to each successively deliver a set quantity of water to a sprinkler. Each dosing valve has a hinged clapper biased to normally open a first outlet leading to the sprinkler and close a second outlet connected to the inlet of the successive dosing valve. Volumetric dosing means hold each clapper to close the first outlet and open the second after delivery of a regulated quantity of water and hold the clapper as long as the water pressure is maintained. When the last dosing valve shuts off supply to the last sprinkler, a gate valve supplying the first dosing valve is automatically or manually closed to allow water in the pipes joining the dosing valves to drain through a discharge orifice, thus enabling automatic resetting of the clappers.

11 Claims, 11 Drawing Figures

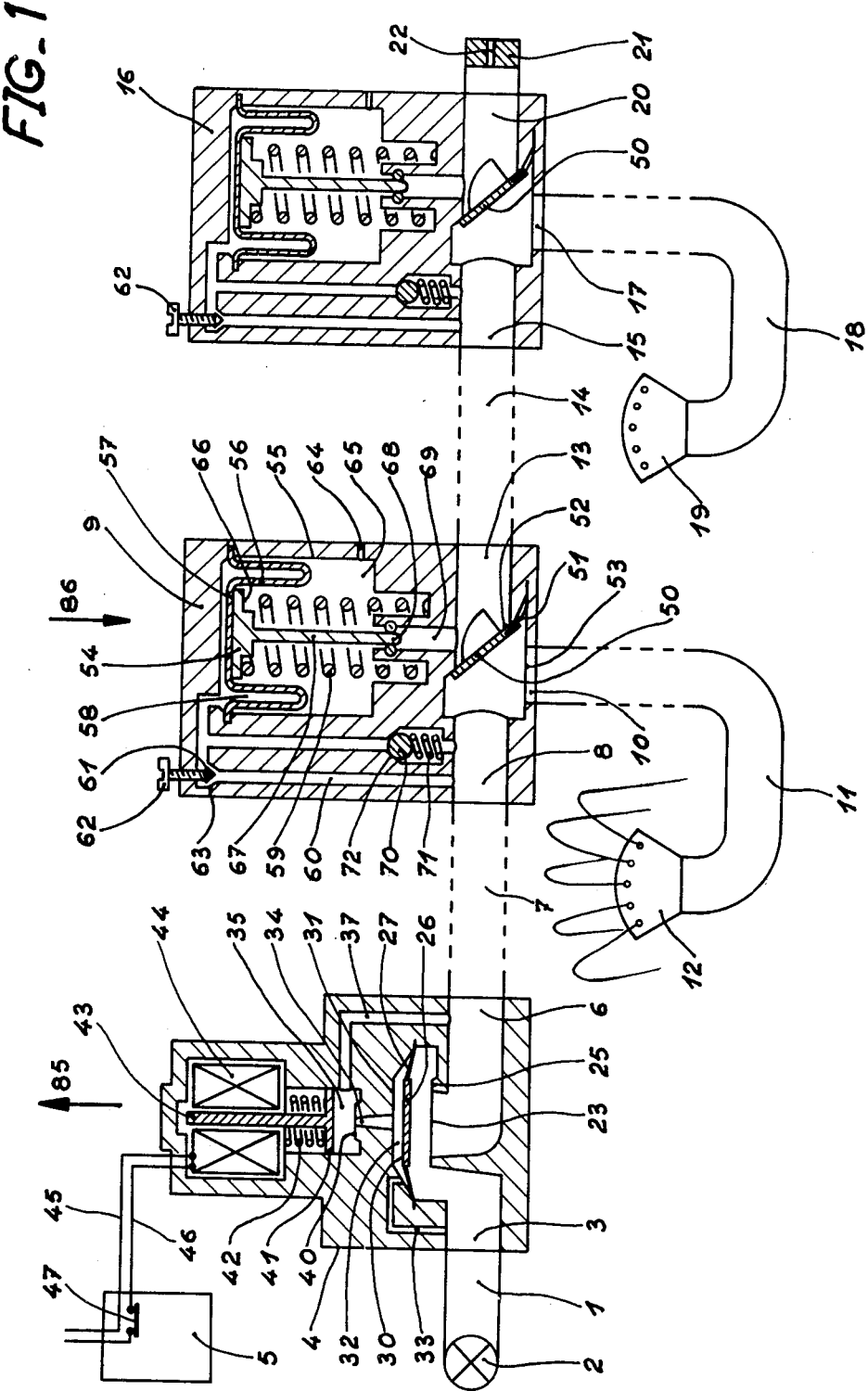

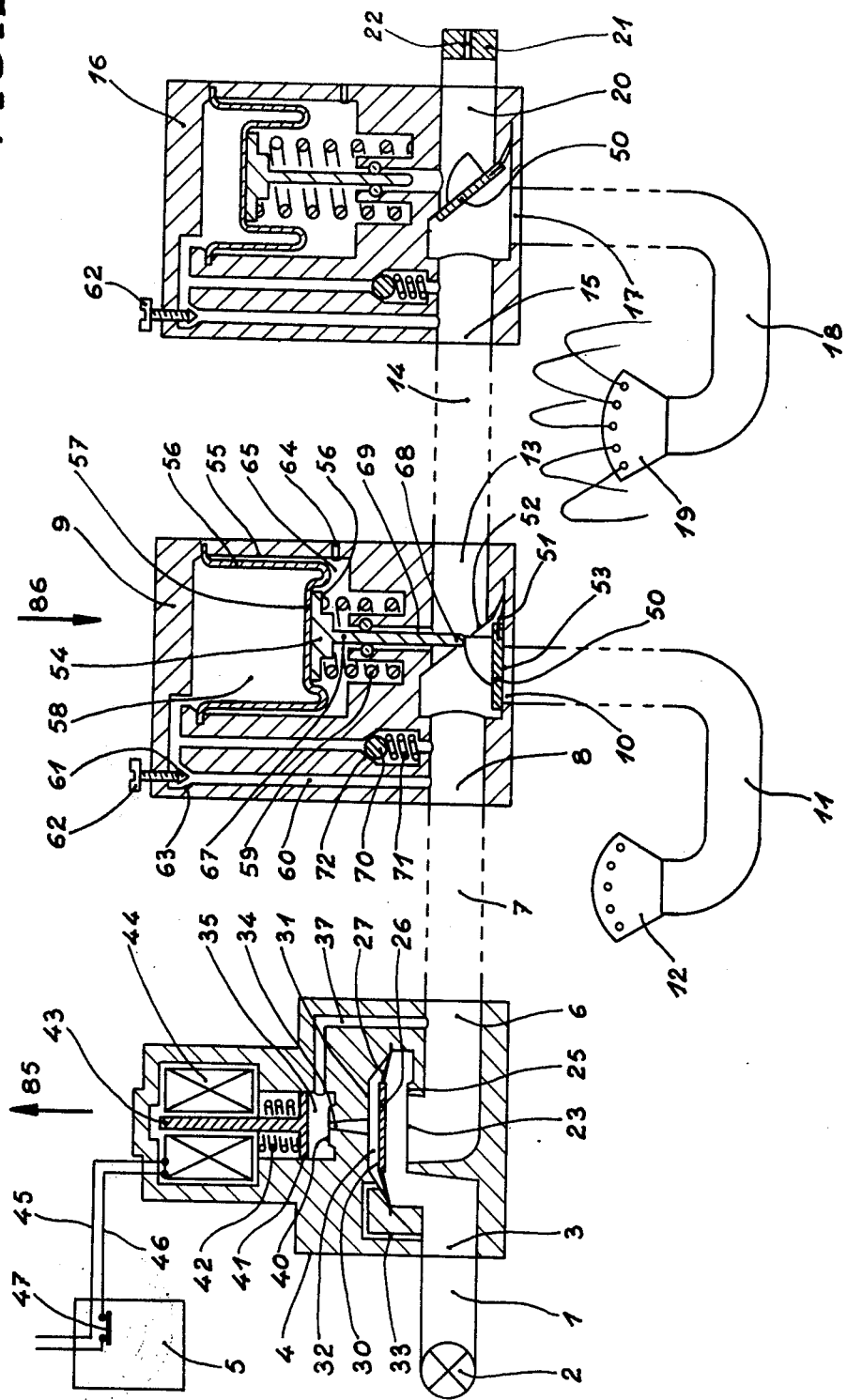
FIG_2

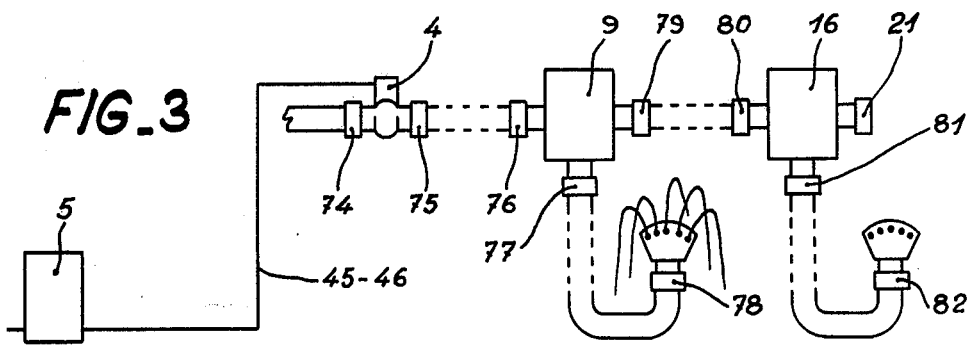
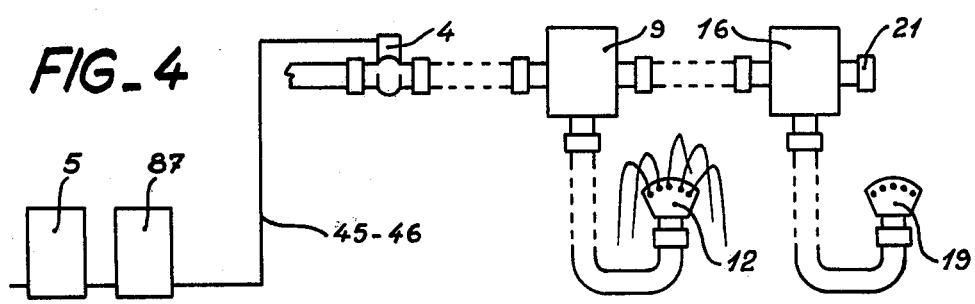
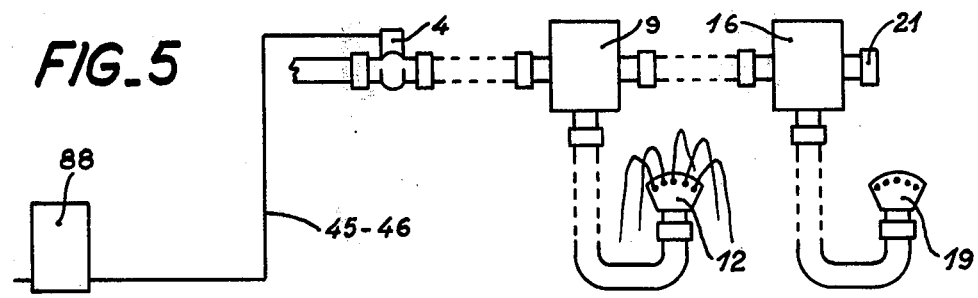
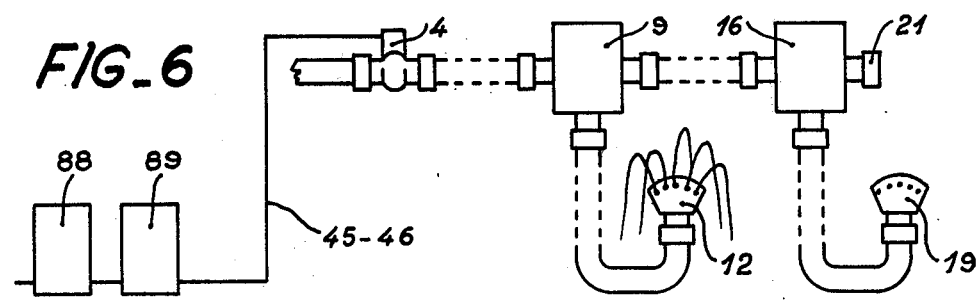

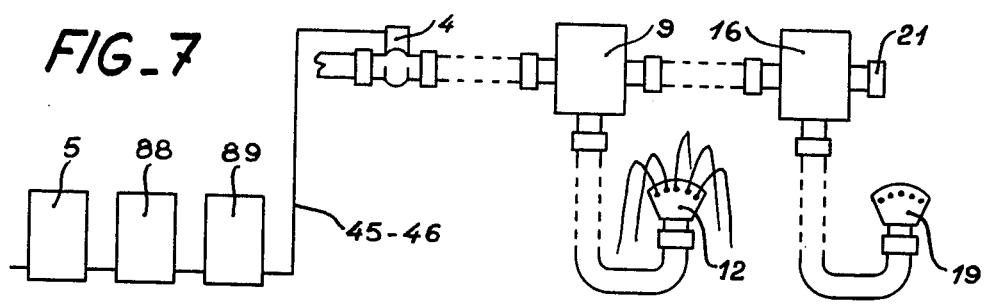
FIG_7
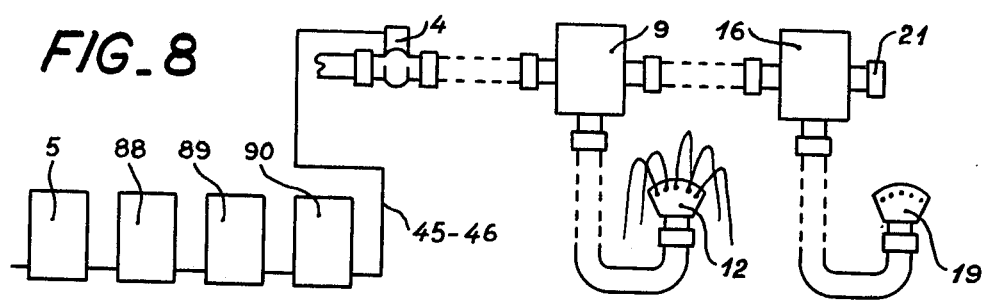
FIG_8
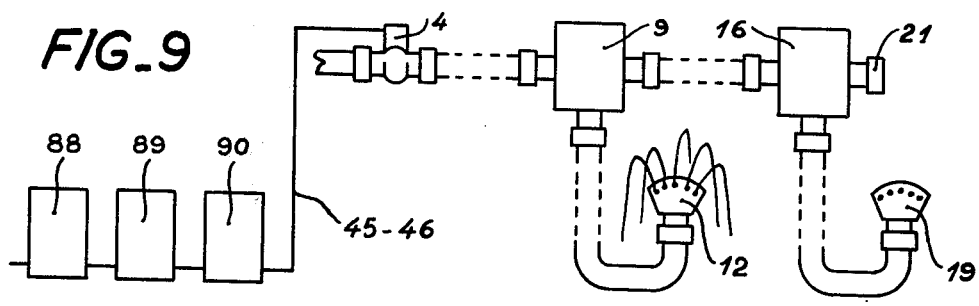
FIG_9
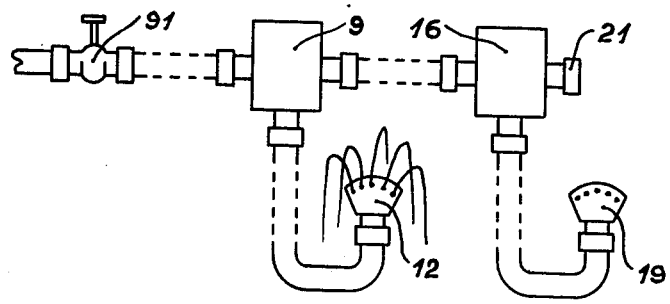
FIG_10

LAWN SPRINKLING AND SIMILAR INSTALLATIONS

BACKGROUND OF THE INVENTION

The invention relates to lawn sprinkling and similar irrigation and liquid distribution installations of the type comprising several dispensing or dosing valves each having an inlet and first and second outlets connected in cascade by their second outlets to each successively control supply of a given quantity of liquid.

In an installation of this type described in the specification of U.S. Pat. No. 2,267,492, each dosing valve has a lever for cocking a spring, this lever holding a valve clapper to close the second outlet orifice when the spring is cocked, thus allowing a quantity of liquid to be delivered through the open first outlet to a sprinkler. A volumetric dosing device is arranged to free the lever after passage of a quantity of liquid, whereby the clapper closes the first outlet orifice and opens the second outlet leading to the next dosing valve. At the end of sprinkling, i.e. when the last of the cascade of dosing valves has operated, each individual dosing valve must be manually cocked to permit a further sprinkling operation. This is inconvenient, all the more so for installations with many dosing valves.

SUMMARY OF THE INVENTION

An aim of the invention is to obviate this inconvenience by enabling the remote control of such dosing valves connected in cascade by a simple opening of a gate valve to begin the sprinkling operation, and closing the gate valve to reset the dosing valves at the end of a sprinkling operation.

According to the invention, a sprinkling installation comprises a plurality of dosing valves each having an inlet and first and second outlets, a liquid supply pipe connected to the inlet of a first dosing valve, a gate valve controlling the delivery of liquid through said supply pipe, the first outlet of each dosing valve being connected to at least one sprinkler, the second outlet of each dosing valve except a last dosing valve being connected by piping to the inlet of a further dosing valve, a plug in the second outlet of said last dosing valve, and an orifice for discharging liquid from said piping connecting the dosing valves, which orifice communicates with the exterior to discharge liquid from said piping at least after closing of said gate valve after closing of the first outlet of said last dosing valve, each dosing valve including: a clapper, means for biasing the clapper to close the second outlet and leave the first outlet open, volumetric dosing means for closing the first outlet and simultaneously opening the second outlet after passage of a given quantity of liquid, said volumetric dosing means including a pusher having a first advanced position after passage of said given quantity of liquid in which first position it holds said clapper against the action of said biasing means to open said second outlet orifice and close said first outlet orifice, and a second withdrawn position in response to a drop in the pressure in said piping after opening of said discharge outlet, in which second position said pusher allows the clapper to move under the action of said biasing means to close said second outlet orifice and open said first outlet orifice.

Hence, due to the provision of the discharge orifice and the conception of the dosing valves, simple closing of the gate valve to cut off the supply automatically ensures resetting of the dosing valves to the initial position ready for a further sprinkling operation. By using a gate valve servo-controlled as a function of the parameters relevant to sprinkling, it is possible to provide an entirely automatic installation.

BRIEF DESCRIPTION OF THE DRAWINGS

Embodiments of spraying installations according to the invention are shown, by way of example, in the accompanying drawings, in which:

FIGS. 1 to 3 schematically show a first embodiment;

FIGS. 4 to 9 each schematically show a variation of the embodiment shown in FIGS. 1 to 3;

FIG. 10 schematically shows a second embodiment and

DESCRIPTION OF THE PREFERRED EMBODIMENTS

Figure 11:
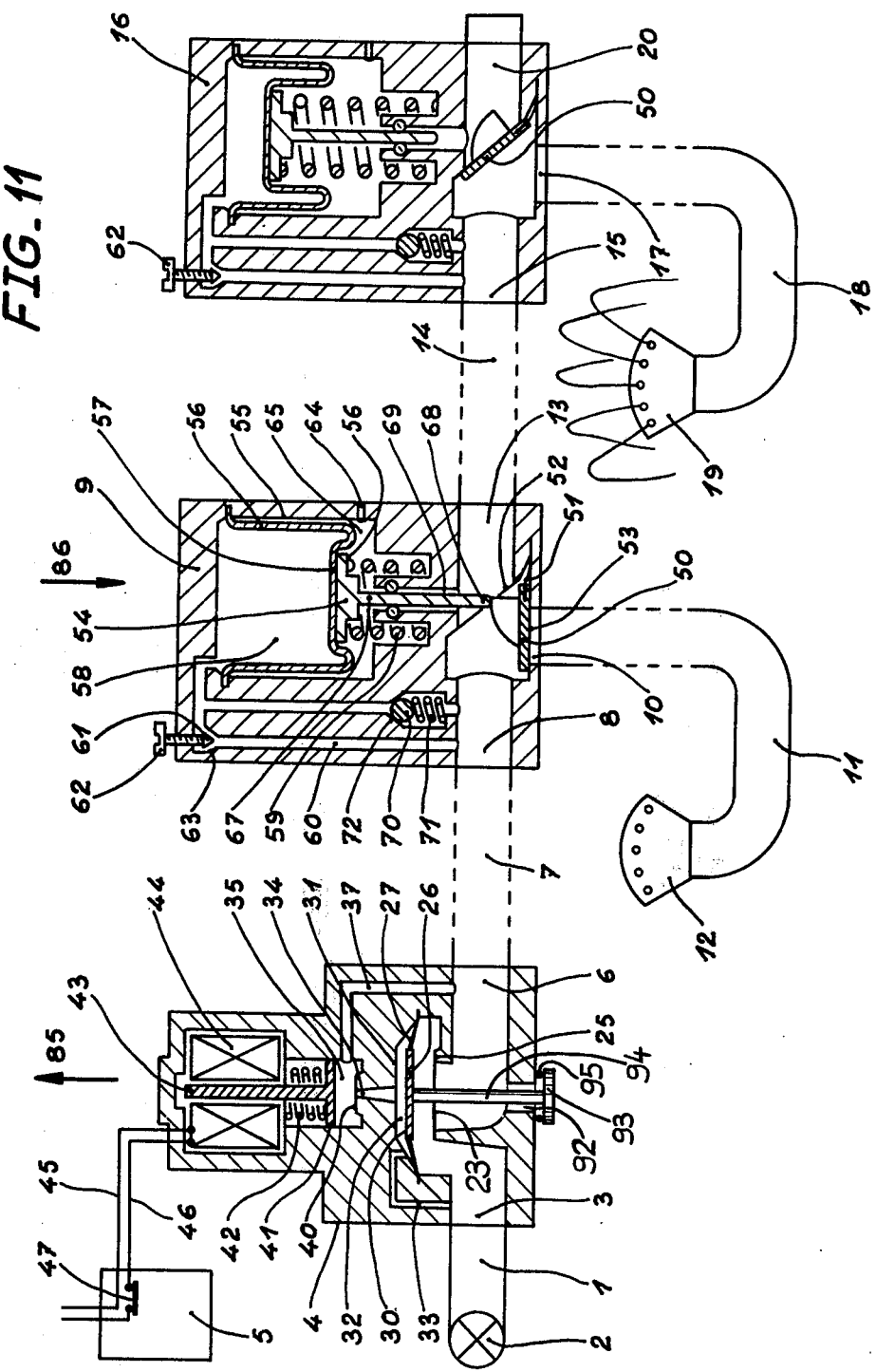
FIG. 11 is a schematic diagram of a third embodiment of sprinkling installation according to the invention.

The sprinkling installation shown in FIGS. 1 and 2 includes a sprinkling liquid supply pipe 1 connecting a source of liquid 2 to an inlet 3 of a gate valve 4 controlled by a clock 5. The valve 4 has an outlet 6 connected by a pipe 7 to the inlet 8 of a first dosing or dispensing valve 9 having a first outlet 10 connected to a pipe 11 to a sprinkler 12, and a second outlet 13 connected by a pipe 14 to the inlet 15 of a second dispensing valve 16. This second dispensing valve has a first outlet 17 connected by a pipe 18 to a sprinkler 19 and a second outlet 20 obturated by a stopper 21, this dispensing valve being, in our example, the last one. Stopper 21 has a discharge orifice formed by a bore 22 of relatively small section.

Valve 4 has an opening 23 able to place the inlet 3 and outlet 6 in communication. Opening 23 has a seat 25 able to receive a mobile clapper 26 supported by a membrane 27 fixed about its periphery to the valve body. At rest, clapper 26 bears against seat 25 and the supply of liquid is thus cut off. A face 30 of clapper 26, opposite seat 25, forms with wall 31 of the valve body a chamber 32 constantly connected to inlet 3 by a duct 33. Chamber 32 is also connected to the outlet 6 via a conical bore 34 of greater section than duct 33, a chamber 35 and a duct 37 of greater section than bore 34.

Chamber 35 has a seat 40 for a mobile piston 41 biased at rest against seat 40 by a spring 42. Piston 41 is integral with a sliding core 43 movably mounted centrally within an electromagnet 44 supplied by conducting leads 45 and 46, the latter including a make-and-break contact 47 which is normally open at rest. Closure of contact 47 is controlled by the mechanism of the clock 5.

The dispensing valves 9 and 16 are identical and are of the type described in applicant's copending application Ser. No. 537,765. Valve 9 has its inlet 8 and its second outlet 13 disposed in extension of one another, and of the same cross-sectional area as the first outlet 10. A clapper-forming flap 50 is hinged by means of an elastic element 51 which biases flap 50 at rest against a seat 52. In this rest position (FIG. 1) the first outlet 10 of valve 9 is open and the second outlet 13 closed. A second seat 53 is provided about the first outlet 10, against which the flap 50 is able to apply to close the first outlet 10 and simultaneously open the second outlet 13.

Valve 9 also has a volumetric dosing device formed by a piston 54 fluid-tightness of which, in a cylinder 55, is provided by a membrane 56 whose periphery is fixed to the cylinder 55. Face 57 of the piston and membrane defines, with the bottom of cylinder 55, a chamber 58 constantly connected to the inlet 8 by a duct 60 including a flow regulator formed by a conical head 61 of an adjusting screw 62 cooperating with a conical seat 63. A spring 59 tends to hold piston 54 in the position shown in FIG. 1. An orifice 64 places end 65 of cylinder 55 constantly in communication with the exterior. A second face 66 of the piston 54 supports a rod 67 whose end 68 is disposed facing a rib on the flap 50. This rod 67 is slidably mounted in a rectilinear passage 69 provided with a joint to ensure a fluid-tight fit. The length of rod 67 is such that when piston 54 of valve 9 occupies the position of FIG. 2, its end 68 holds the flap 50 in a position to close the first outlet 10, the second outlet 13 being open.

Chamber 58 is also able to communicate with inlet 8 via a one-way valve formed by a ball 70 biased by a spring 71 against a seat 72, and which allows flow of liquid in one direction only, from the chamber 58 towards inlet 8, when the pressure in inlet 8 is less than that in chamber 58. The second dispensing valve 16 is identical to the first dispensing valve 9. Pipes 1, 7, 11, 14 and 18 joining the component parts of the installation have identical sections, at least equal to those of the inlets and outlets of the dispensing valves.

Identical connection means in the form of unions 74 to 82 are provided to join these pipes to the components of the installation, as shown in FIG. 3. These unions could be replaced by tubular sleeves whose inner diameter corresponds to the outer diameter of the pipes and of the inlets and outlets of the gate valve, the dispensing valves and the sprinklers, with outer gripping collars fluid-tightly securing these sleeves. The pipes are rigid or preferably semi-rigid, if they have to be buried, or flexible if they may simply be placed on the ground.

Setting up of the sprinkling installation is carried out as follows: after having checked that the delivery pipe 1 has a sufficient supply, about 2 m³/hour, the user arranges the sprinklers and the dispensing valves on the ground is a desired configuration. The gate valve 4 is then connected to the delivery pipe 1 and, if possible close thereby, the modular control element or elements, in our case clock 5. The gate valve 4 is then connected to the first dispensing valve 9 and the latter to the first sprinkler 12, cutting as required the desired lengths from a roll of semi-rigid pipe, for example in plastics material. The various dispensing valves (in the example, only valve 16) are successively connected in the same manner. This connection can be made rapidly using identical unions 74 to 82. The relative flexibility of the pipes enables the various dispensing valves to be connected avoiding sharp bends, which limits head losses. It also enables, during trial sprinkling which is then carried out, slight modification of the positions of the already-connected dispensing valves and sprinklers. When the trials are satisfactory, all that remains is to bury the pipes, dispensing valves and sprinklers, if desired.

Operation of this sprinkling installation is as follows: each day at a predetermined and adjustable time, clock 5 closes contact 47, current flows in leads 45 and 46 and electromagnet 44 is energized, which moves the slidable core 43 and piston 41 according to arrow 85.

The bore 34 is thus opened, as shown in FIG. 1. Sprinkling liquid flows from chamber 32 to the outlet orifice 6, via bore 34, chamber 35 and duct 37; in view of the difference of section between bore 37 and the ducts, the liquid flows faster out of chamber 32 through bore 34 that it can enter chamber 32 via duct 33; the pressure in chamber 32 thus drops below the pressure in inlet 3. Membrane 27 and clapper 26 thus move upwards, and opening 23 is opened. A depression is maintained in chamber 32 as long as piston 41 is withdrawn, i.e. as long as the electro-magnet 44 is energized. As long as piston 41 is withdrawn, the opening 23 also remains open.

The sprinkling liquid thus arrives at the inlet 8 of the first dispensing valve 9 and it flows through its first outlet 8 into sprinkler 12, the pressure of the liquid applies the flap 50 against seat 52. The second outlet 13 is hence obturated and the liquid does not flow into the dispensing valve 16 and sprinkler 19. At the same time, liquid enters the duct 60 and flows through the delivery regulator into chamber 58. Piston 54 is pushed by the liquid under pressure with a speed that depends on the presetting of screw 62. The slower the speed of the piston, the greater the volume of liquid dispensed through the first outlet before it is closed. After the major part of the path of piston 54 according to arrow 86, the end 68 of rod 67 comes into contact with the rib of flap 50 and moves it to come to be applied against seat 53, as shown in FIG. 2.

The first outlet 10 is thus closed and simultaneously the second outlet 13 opened. The sprinkler 12 ceases to operate and simultaneously the sprinkling liquid arrives at the inlet 15 of the second dispensing valve 16 and flows through the first outlet 17 into the sprinkler 19 which, in turn, will distribute a volume of liquid that depends solely on the setting of its regulator screw 62. At the appropriate time, the flap 50 of dispensing valve 16 closes the first outlet 17 and simultaneously opens the second outlet 20. All of the dispensing valves thus operate in turn and enable operation in cascade of the sprinklers, one operating when the preceding one stops. In our example, as the dispensing valve 16 is the last, sprinkling is finished, the flap 50 of each dispensing valve holding the corresponding first outlet closed.

After a time depending on the setting of the mechanism of clock 5, contact 47 is opened, the electromagnet 44 of valve 4 is no longer energized, and piston 41 comes to apply against its seat 40 under the action of spring 42. The pressures in chamber 32 and inlet 3 equalize and clapper 26 reassumes its rest position against its seat 25, the opening 23 thus being closed.

To return the flaps 50 of the dispensing valves to the rest position, ready for another sprinkling operation, the pressure of liquid in the pipes 7 and 14 connecting the gate valve 4 to the first dispensing valve and the dispensing valves together is brought to a value close to atmospheric pressure by a discharge means, formed in the example by orifice 22. This orifice 22 already allows a slight leakage as soon as the second outlet 20 of the valve 16 opens, but this leakage is only effective to produce a pressure drop from the moment when the clapper 23 of gate valve 4 is closed. When the pressure in pipes 7 and 14 and in the inlet and the second outlet of each dispensing valve drops below the pressure in chambers 58 by a certain amount, each ball 70 compresses its spring 71 to place the chambers 58 and the inlet of each dispensing valve into communication. Each piston 54 is thus free and moves under the action of its spring 59, to disengage rod 69 from flap 50 which reassumes the position of FIG. 1, the first outlet of each dispensing valve being open and the second closed. The installation is ready for a new sprinkling operation.

If the user observes that too much or too little water is delivered by certain sprinklers, the quantity delivered is modified simply by adjusting the setting screw 62 of the appropriate dispensing valve. This adjustment modifies solely the quantity of liquid delivered by each dispensing valve concerned, and in no way modifies the amount entering the other dispensing valves of the installation.

The described gate valve 4 may advantageously be replaced by the valve described in applicant's copending application Ser. No. 519,045. The latter valve has a twofold interest: on the one hand it does not require the control electromagnet to be permanently energized during the sprinkling operation; on the other hand it automatically closes when the flow of liquid in the sprinkling circuit is interrupted, which is the case when, at the end of sprinkling, the flap 50 of the last dispensing valve closes its first outlet.

In the variant shown in FIG. 11, the discharge orifice 22 is replaced by a discharge orifice 92 on the first valve 4, this orifice 92 is adapted to be closed by a valve member 93 which is connected by a rod 94 to the clapper 26. The tightness is assured by a seal 95 fastened, for instance by bonding, to the closure member 93. The drawing shows the sprinkling installation in operation, the last sprinkler 16 being in operation. The clapper 26 is then open while the valve member 93 is closed. If one then relaxes or releases the piston 43 as described before the clapper 26 closes the opening 23, simultaneously causing the opening of the discharge orifice 92 and placing the outlet 6, that is to say the entire line downstream of this orifice, in communication with the exterior. The drop in pressure which results therefrom causes the shutting of the closure member 50 of the last valve which then closes the outlet 17.

According to a first varied embodiment, shown in FIG. 4, a second modular control element formed by a sprinkling day selector 87 cooperates with clock 5. Selector 87 is able to actuate a contact, in series with that of clock 5, the closing of which, at least one day per week, controls opening of gate valve 4 when the clock contact is simultaneously closed.

According to a second varied embodiment, shown in FIG. 5, the clock and selector are replaced by a single modular element formed by an evaporimeter 88 having a detector which, according to the quantity of liquid in a tank of the evaporimeter, actuates or does not actuate a contact controlling opening of gate valve 4.

FIG. 6 shows a third varied embodiment, in which a second modular control element, formed by a detector 89 adapted to instantaneously react to rainfall, cooperates with the evaporimeter 88 of the preceding variation. In the case of rainfall during a sprinkling operation, it actuates the contact of evaporimeter 88 or a second contact to control closing of gate valve 4 and hence interruption of sprinkling.

According to a fourth varied embodiment, a second modular element is formed by the evaporimeter 88 which cooperates with clock 5; according to the quantity of liquid in the tank of the evaporimeter, its detector is arranged to actuate or not actuate a contact controlling opening of gate valve 4 when the clock 5 simultaneously controls this opening, for example by closing its contact 47.

FIG. 7 shows a fifth varied embodiment in which a detector 89 for reacting instantaneously to rainfall cooperates with the two modular elements of the fourth variation in such a manner that in the event of rainfall during a sprinkling operation, it actuates the contact of evaporimeter 88 or a second contact to control closing of gate valve 4 and hence interruption of sprinkling.

According to a sixth varied embodiment, shown in FIG. 8, a fourth modular element formed basically of a photosensitive element 90, cooperates with the three modular elements of the fifth variation. It is connected for example to prevent opening of valve 4 in the event of too strong sunshine at the moment of sprinkling.

According to a seventh varied embodiment, shown in FIG. 9, an evaporimeter 88, rain detector 89, and photosensitive element 90 are used without clock 5. The time is thus not a decisive factor for sprinkling. This variation amounts to adding the photosensitive element 90 to the modular elements in the third described variation.

These variations have been given only by way of example to show how employment of modular control elements allows a great flexibility of use of installations according to the invention.

FIG. 10 shows another embodiment of installation in which the electromagnetically controlled gate valve 4 is replaced by a manually controlled gate valve or tap 91. It suffices to open tap 91 by hand to start the sprinkling operation, the dispensing valves 9 and 16 supplying sprinklers 12 and 19 respectively in cascade, as previously described for the first embodiment. When the last sprinkler, here 19, has operated, tap 91 is closed by hand to allow the flaps 50 of valves 9 and 16 to move back to their rest positions, ready for a further sprinkling. This embodiment is the simplest installation that can be provided in accordance with the invention but, by later replacing of tap 91 by an electromagnetically controlled gate valve, can be converted to any of the previously described variations at will.

The installation according to the invention may be used whenever a relatively weak supply of liquid is available but must be used to supply a large number of dispensing units, while easily controlling the quantity of liquid delivered by each unit. It is especially suitable for automatic or non-automatic lawn sprinkling installations, but can also be used for filling water troughs, and for underground or other irrigation.

What is claimed is:

1. A sprinkling or similar liquid-distribution installation comprising a plurality of dosing valves each having an inlet and first and second outlets, a liquid supply pipe connected to the inlet of a first dosing valve, a gate valve controlling the delivery of liquid through said supply pipe, the first outlet of each dosing valve being connected in operation to at least one sprinkler, piping connecting the second outlet of each dosing valve except a last dosing valve being to the inlet of a next sequential dosing valve, a plug in the second outlet of said last dosing valve, means having an orifice for discharging liquid from said piping connecting the dosing valves, said orifice communicating with the exterior to discharge liquid from said piping after closing of said gate valve, after closing of the first outlet of said last dosing valve, each dosing valve including a clapper, means for biasing the clapper to close the second outlet and leave the first outlet open, volumetric dosing means for closing the first outlet and simultaneously opening the second outlet after passage of a given quantity of liquid, said volumetric dosing means including a pusher having a first advanced position after passage of said given quantity of liquid in which first position it holds said clapper against the action of said biasing means to open said second outlet orifice and close said first outlet orifice, and a second withdrawn position in response to a drop in the pressure in said piping after opening of said discharge outlet, in which second position said pusher allows the clapper to move under the action of said biasing means to close said second outlet orifice and open said first outlet orifice.

2. An installation according to claim 1, in which said means having said discharge orifice comprises said plug.

3. An installation according to claim 1, in which said means having said discharge orifice comprises means in said gate valve adjacent an outlet of the gate valve, said orifice being opened when the gate valve is closed.

4. An installation according to claim 1, including piping connecting the dosing valves each connected to a respective sprinkler, and said piping having substantially the same section as said piping connecting the dosing valves.

5. An installation according to claim 4, comprising identical union means for connecting said piping and said pipes to the respective components of the installation.

6. An installation according to claim 1, comprising modular control means for controlling opening of said gate valve, said modular control means detecting a physical variable for controlling each gate valve as a function of the physical variable sensed.

7. An installation according to claim 6, in which said modular control means comprises a clock.

8. An installation according to claim 7, comprising a second modular control means comprising a sprinkling day selector cooperating with the clock for selecting a day and time for sprinkling.

9. An installation according to claim 6, in which said modular control means comprises an evaporimeter.

10. An installation according to claim 9, comprising a further modular control means comprising a detector for controlling closure of the gate in the event of rainfall.

11. An installation according to claim 10, comprising another modular control means comprising a photosensitive element for preventing sprinkling in the event the day is too sunny.

* * * * *